W. W. ABBOTT.
COUPLING.
APPLICATION FILED APR. 14, 1911.
1,009,458.
Patented Nov. 21, 1911.
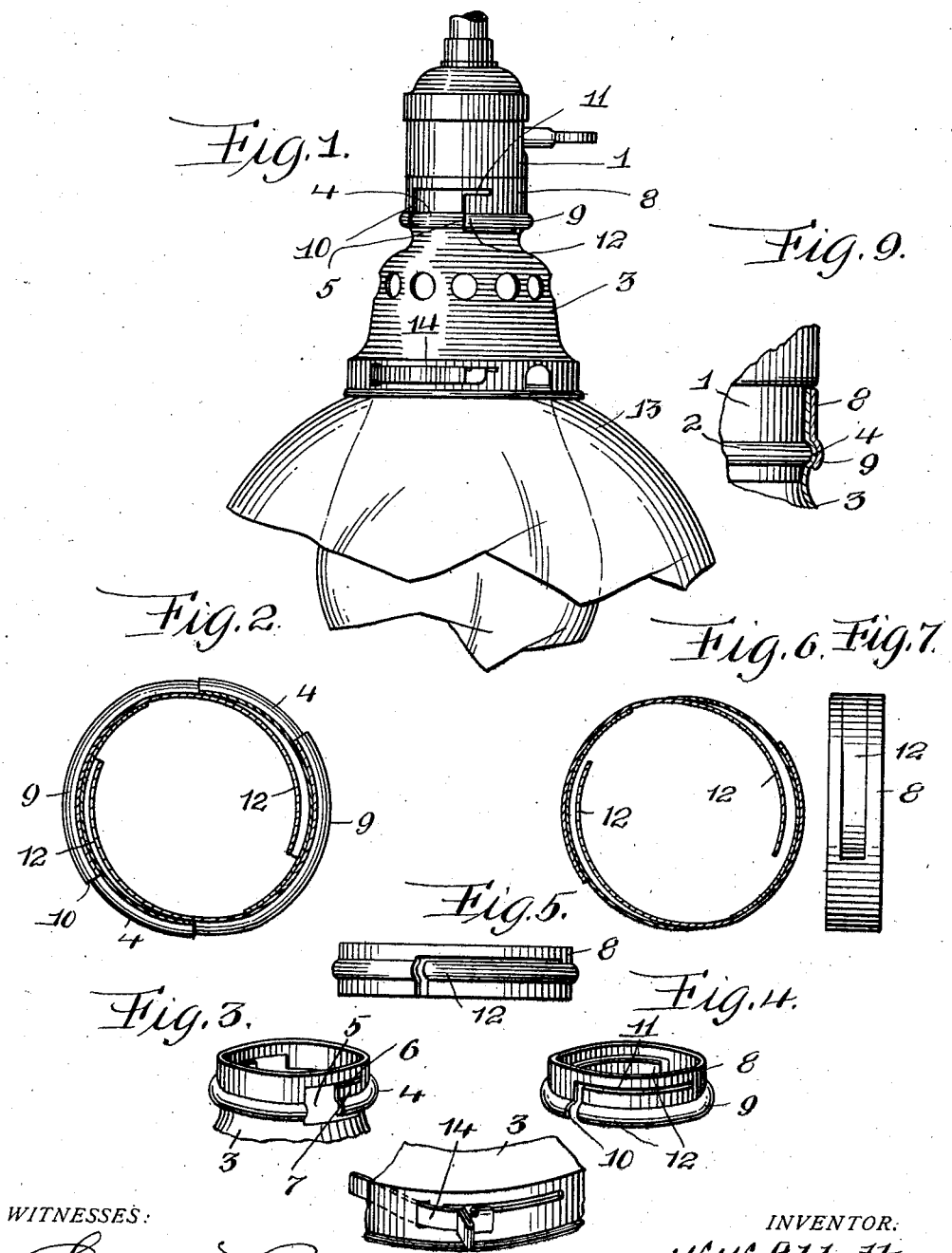
WITNESSES:
INVENTOR:
W. W. Abbott,
BY
ATTORNEYS.

UNITED STATES PATENT OFFICE.

WILLIAM W. ABBOTT, OF INGRAM, PENNSYLVANIA.

COUPLING.

1,009,458.     Specification of Letters Patent.     Patented Nov. 21, 1911.

Application filed April 14, 1911. Serial No. 621,148.

*To all whom it may concern:*

Be it known that I, WILLIAM W. ABBOTT, a citizen of the United States of America, residing at Ingram, in the county of Allegheny and State of Pennsylvania, have invented certain new and useful Improvements in Couplings, of which the following is a specification, reference being had therein to the accompanying drawing.

This invention relates to couplings, and the object of my invention is to provide positive and reliable means, in a manner as will be hereinafter set forth, for connecting two bodies or parts whereby they cannot become accidentally separated or displaced.

My invention aims to provide a coupling consisting of comparatively few parts, easily assembled and adjusted. A coupling has been particularly designed for gas and electric light fixtures and can be advantageously used for connecting a globe holder to an electric light socket or lamp. It is in this connection that my invention obviates the necessity of using set screws or detachable fastening means for connecting a globe holder to a socket or a globe to the holder.

The invention will be hereinafter specifically described and then claimed, and reference will now be had to the drawing, wherein there is illustrated the preferred embodiments of my invention, but it is to be understood that the structural elements are susceptible to such changes as fall within the scope of the appended claims.

In the drawing:—Figure 1 is a side elevation of the coupling. Fig. 2 is an enlarged horizontal sectional view of the same. Fig. 3 is a perspective view of the detachable member of the coupling. Fig. 4 is a perspective view of the adjustable member of the coupling. Fig. 5 is a side elevation of a modified form of movable member. Fig. 6 is a horizontal sectional view of a modified form of coupling. Fig. 7 is a side elevation of another modified form of movable member. Fig. 8 is a perspective view of a portion of the globe holder, and Fig. 9 is a vertical sectional view of a portion of the coupling.

The reference numeral 1 denotes an electric light socket having an annular bead 2, said socket constituting what I term the stationary member of the coupling.

3 denotes a globe holder having the upper end thereof reduced and provided with an annular bead 4. The reduced end of the globe holder is adapted to fit over the stationary member 1 and the reduced end of said globe holder has diametrically opposed walls thereof provided with openings 5 and the reduced end of a holder at one end of each of the openings, is slitted, as at 6 to provide a lip 7.

8 denotes a band constituting the movable member of the coupling. The band has an annular bead 9 adapted to embrace the bead 4 of the globe holder 3, and diametrically opposed walls of the band 8 are provided with vertical slots 10 and longitudinal slots 11, these slots providing a tongue 12 which has the end thereof bent inwardly to enter the opening 5 and ride under the globe holder at the opposite end of the opening 5 from the lip 7, as best shown in Fig. 2 of the drawing.

In Fig. 5 there is illustrated a modification of the movable member, which is of a greater depth than the member shown in Fig. 4, and in Figs. 6 and 7 there is another modification of the coupling, wherein the beads 2, 4 and 9 are dispensed with. In Fig. 8 of the drawing there is illustrated a globe fastener that is used at the lower end of the globe holder for retaining a globe 13 in engagement with the holder. The fastener comprises a resilient gripping member 14 that is slidably held by the lower end of the globe holder 3.

From the foregoing it will be observed that it is only necessary to partially rotate the movable member of the coupling to lock the globe holder in engagement with the stationary member 1, and the further the movable member is rotated the more positive the purchase obtained upon the stationary member, as the tongues 12 riding between the beads 4 and 2 tend to more firmly wedge and bind the upper end of the globe holder upon the stationary member.

What I claim is:—

1. In a coupling, a stationary member, a detachable member arranged upon said stationary member and having openings formed therein, and a movable member arranged upon said detachable member and having angle-shaped slits to provide tongues adapted to enter said openings and extend between said stationary and said detachable members, substantially as described.

2. In a coupling, a stationary member having an annular bead, a detachable member adapted to fit upon said stationary member and having an annular bead to engage the bead of said stationary member, said detachable member having openings formed therein, a movable member arranged upon said detachable member and having an annular bead engaging the bead of said detachable member, and tongues carried by said movable member, and adapted to enter the openings of said detachable member and wedge between said detachable member and said stationary member, substantially as described.

In testimony whereof I affix my signature in the presence of two witnesses.

WILLIAM W. ABBOTT.

Witnesses:
MAX H. SROLOVITZ,
CHRISTINA T. HOOD.